(12) United States Patent
Buchanan et al.

(10) Patent No.: US 8,277,639 B2
(45) Date of Patent: Oct. 2, 2012

(54) STEAM CRACKING OF HIGH TAN CRUDES

(75) Inventors: John Scott Buchanan, Lambertville, NJ (US); Paul F. Keusenkothen, Houston, TX (US); Stephen Harold Brown, Pennington, NJ (US); Julian A. Wolfenbarger, Houston, TX (US); James Earl Graham, Baytown, TX (US); James N. McCoy, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 2208 days.

(21) Appl. No.: 11/231,490

(22) Filed: Sep. 20, 2005

(65) Prior Publication Data

US 2007/0066860 A1  Mar. 22, 2007

(51) Int. Cl.
*C10G 9/36* (2006.01)
*C10G 17/00* (2006.01)

(52) U.S. Cl. ........ 208/130; 208/263; 208/128; 208/129; 208/132; 208/189; 585/648; 585/650

(58) Field of Classification Search .......... 208/128, 208/129, 130, 132, 189, 263; 585/648, 650
See application file for complete search history.

(56) References Cited

U.S. PATENT DOCUMENTS

| | | | | |
|---|---|---|---|---|
| 1,953,353 | A | 4/1934 | Lazar et al. | 196/1 |
| 3,487,121 | A * | 12/1969 | Hallee | 585/652 |
| 3,617,493 | A | 11/1971 | Wirth et al. | 208/80 |
| 5,820,750 | A | 10/1998 | Blum et al. | 208/263 |
| 5,891,325 | A | 4/1999 | Bearden et al. | 208/263 |
| 6,086,751 | A | 7/2000 | Bienstock et al. | 208/263 |
| 6,632,351 | B1 | 10/2003 | Ngan et al. | 208/132 |
| 2004/0004022 | A1 | 1/2004 | Stell et al. | |
| 2004/0004028 | A1 | 1/2004 | Stell et al. | 208/130 |
| 2004/0069682 | A1 | 4/2004 | Freel et al. | 208/126 |
| 2004/0069686 | A1 | 4/2004 | Freel et al. | 208/226 |

* cited by examiner

*Primary Examiner* — Prem C Singh
*Assistant Examiner* — Michelle Stein

(57) ABSTRACT

The invention is directed to a process comprising feeding high TAN feedstreams to a steam cracker, whereby naphthenic acids in the feedstreams are substantially converted to CO, $CO_2$, and low amounts of smaller acids (e.g., formic, acetic, propionic, and butyric acids). The feedstream is preferably a high TAN feedstream comprising crude or high TAN feedstream which has previously been subjected to a refinery process to remove resid.

24 Claims, No Drawings

STEAM CRACKING OF HIGH TAN CRUDES

FIELD OF THE INVENTION

The invention relates to treatment of crude feedstock and crude fractions containing high Total Acid Number (TAN).

BACKGROUND OF THE INVENTION

Conventionally, crude feedstocks are subjected to refining treatment including desalting, atmospheric distillation, vacuum distillation, and other steps to separate out various fractions, which are typically then subjected to further treatment to yield useful products. It is common, for instance, to use fractions such as naphtha and gasoil as feeds to a steam cracker, where they are pyrolyzed to ethylene, propylene, butylenes, and other molecules which can be oligomerized (e.g., from light olefins to heavier olefins), polymerized (e.g., polyethylene, polypropylene), and/or functionalized (e.g., acids, alcohols, aldehydes and the like).

Certain components in the crude are objectionable because they can negatively effect one or more of the refining steps. The nature and concentration of these objectionable components can affect the value of the crude.

Naphthenic acid, a generic name used for organic acids present in crude oils, is highly objectionable in the refining of crude. The presence of such acids can cause various problems in the refining process, particularly with respect to corrosion of equipment such as towers and heat exchangers. Extensive treatments using anti-corrosion additives and/or expensive metallurgy changes are sometimes required.

Total Acid Number, or TAN, is considered a measure of the naphthenic acid content of a sample. High Total Acid Number (TAN) crudes are typically much less valuable than crudes that do not have high acid concentrations. TAN, as used herein, is determined by ASTM method D-664 and takes the units of mg KOH/gm oil; for economy of description the method of measurement and units will not be repeated.

The primary effects of High TAN content in crudes or crude fractions on steam cracking include increased corrosion rates in the furnace facilities, inlet piping, upper half of the convection section, and primary fractionator bottoms due to organic acids in the feed; increased corrosion rates and waste water limitations in the recovery section due to acidic byproducts (e.g., $CO_2$, light organic acids) and specialty additives (e.g, phosphorus) added by refineries to inhibit TAN corrosion. Such additives have been linked to increased coking rates and radiant tube damage in steam cracking furnaces from refinery distilled steam cracker feeds.

In the past, high TAN crudes could be avoided because of the abundance of other types of crudes. However, as the supply of crude dwindles, it become imperative that the aforementioned problems be addressed. Accordingly, it would be beneficial if an efficient and cost-effective method of treating/processing high TAN crudes could be devised.

Current commercial processes typically run crude through a refinery pipestill to separate the crude into various fractions, such as a gasoil fraction. The pipestill step (i.e., distillation) does not destroy a significant amount of TAN. The gasoil fraction, among others, may be subsequently steam cracked to yield light olefins. A basic material, such as an amine, may be injected to neutralize the remaining acidity (generally light aliphatic acids such as acetic and formic acids) in the steam cracked products.

U.S. Pat. No. 1,953,353 teach treatment of a feedstock comprising organic acids like phenols and naphthenic acids, or a distillate thereof, to a temperature treatment of between 600° F. (about 315° C.) and 750° F. (about 400° C.) under atmospheric pressure, preferably wherein the oil is a distillate that has first been subjected to a treatment with liquid sulfur dioxide. This heat-soak treatment may have been satisfactory at a time when energy was relatively cheap, but separate temperature treatments are to be avoided if possible.

U.S. Pat. No. 5,820,750 is also directed to removal of petroleum acids from crudes by thermal treatment. The treatment comprises heating the feed to a temperature of at least 400° F. (about 205° C.), preferably at least 600° F. (about 315° C.) preferably up to 900° F. (about 480° C.) for a period of time sufficient to reduce substantially TAN of the feed while constantly sweeping away inhibitors indigenous or formed during the decomposition, e.g., water vapor. According to the patent, this process is said to be useful for crudes with TAN above about 2, in order to reduce TAN to levels less than about 1.5.

U.S. Pat. No. 5,891,325 relates to a process for reducing organic acids comprising thermally treating a petroleum feed containing in a thermal reaction zone comprising a plurality of stages in series to produce a volatile organic acids containing hydrocarbon fraction and non-volatile hydrocarbon fraction, treating the volatile hydrocarbon fraction to neutralize the organic acids, and then blending the thus-treated volatile hydrocarbon fraction with the non-volatile hydrocarbon fraction. The thermal treatment is at a temperature of 400° F. (about 205° C.) to 800° F. (about 425° C.). Treatment to neutralize the organic acids includes the use of suitable salts such as CaO, $Ca(OH)_2$, $CaCO_3$, and magnesium analogs.

U.S. Pat. No. 6,086,751 teaches to reduce the naphthenic acid content of crude by a process comprising flashing crude to remove substantially all the water therein, followed by a thermal treatment in a reactor at 650° F. (about 340° C.) to 800° F. (about 425° C.).

U.S. Patent Application Nos. 2004/0069682 and 2004/0069686 are directed to upgrading of heavy petroleum oils that are typically not suitable for pipelining without the use of diluents. It utilizes pyrolytic reactors operating under conditions that result in a rapid distillation with coke formation, and is said to reduce TAN. The process comprises introducing a particulate heat carrier to interact with the feedstock, separating the vapors of the product stream from the heat carrier, and regenerating the heat carrier using a calcium compound.

The present inventors have surprisingly discovered that high TAN crudes and high TAN refinery cuts may be directly introduced into a steam cracker pyrolysis unit without the necessity of a heat-soak treatment and/or without the necessity of chemical treatment, to obtain a product from the steam cracker that is significantly reduced in TAN.

SUMMARY OF THE INVENTION

The invention is directed to a process comprising feeding high TAN feedstreams to a steam cracker, whereby naphthenic acids in the feedstreams are substantially converted to CO, $CO_2$, and low amounts of lower molecular weight acids (e.g., formic, acetic, propionic, and butyric acids). The feedstream is preferably a high TAN feedstream comprising crude or high TAN feedstream which has previously been subjected to a refinery process such as distillation to remove resid.

The invention is also directed to a process comprising feeding high TAN feedstream to the convection section of a pyrolysis unit to preheat the feedstream, optionally flashing the feedstream in a flash drum to drop out the heaviest fraction (e.g., asphaltenes), and further processing the overheads from the flash drum in the radiant section of a pyrolysis unit.

In a preferred embodiment, the product of the pyrolysis furnace comprises a vapor phase including ethylene, propylene, butenes, and a liquid phase comprising C5+ species. The liquid product of the pyrolysis furnace is preferably distilled in a primary fractionation step to yield an overheads comprising steam-cracked naphtha fraction (i.e., C5-C10 species) and steam cracked gas oil fraction (i.e., a boiling range of about 400° F. to 550° F., e.g., C10-C15/C17 species), and a bottoms fraction comprising tar (i.e., a boiling range of above about 550° F., e.g., C15/17+ species).

In a more preferred embodiment, any remaining acids in the effluent may be subsequently neutralized by a basic material, preferably an amine, and more preferably by amine injection near the primary fractionator quench zone and prior to water condensation.

It is an object of the present invention to avoid the refinery process and attendant distillation step(s) and/or avoid separate heating steps such as a heat-soak in the production of useful products from high TAN crudes, particularly steam-cracking products such as olefins.

It is also an object of the invention to provide a process for treating high TAN crudes and refinery fractions while avoiding steps of adding materials to the feed that require subsequent steps of separation.

These and other objects, features, and advantages will become apparent as reference is made to the following detailed description, preferred embodiments, examples, and appended claims.

DETAILED DESCRIPTION

According to the invention, high TAN feedstreams are provided to a steam cracker (or other pyrolysis unit), whereby naphthenic acids in the feedstreams are converted to CO, $CO_2$, and low amounts of smaller acids (e.g., formic, acetic, propionic, and butyric acids), optionally including a step of flashing the feedstream to remove heavies such as asphaltenes, after the feedstream has been preheated in the convection section of the steam cracker and prior to passing at least a portion of said feedstream into the radiant section of the pyrolysis unit.

The term "steam cracker" as used herein is also known more generally as a thermal pyrolysis unit. Steam, although optional, is typically added inter alia to reduce hydrocarbon partial pressure, to control residence time, and to minimize coke formation. In preferred embodiments the steam may be superheated, such as in the convection section of the pyrolysis unit, and/or the steam may be sour or treated process steam.

A preferred hydrocarbon feedstream comprises, in addition to naphthenic acids, crude with resid and having TAN of greater than or equal to 0.5, more preferably about 1.0 or higher, still more preferably about 1.5 or higher, yet still more preferably 2.0.

In the case where the feed comprises crude or atmospheric resids that contain an appreciable amount of resid, the high TAN feed, after being preheated in the convection section of a pyrolysis unit, is passed through a flash drum to drop out the heaviest fraction (e.g., substantially all the asphaltenes). The terms "flash drum", "flash pot", "knock-out drum" and "knock-out pot" are used interchangeably herein; they are per se well-known in the art. In a preferred embodiment, the composition of the vapor phase leaving the flash drum is substantially the same as the composition of the vapor phase entering the flash drum, and likewise the composition of the liquid phase leaving the flash drum is substantially the same as the composition of the liquid phase entering the flash drum, i.e., the separation in the flash drum consists essentially of a physical separation of the two phases entering the drum.

The preferred flash pots and their integration with pyrolysis units have previously been described in U.S. Patent Application Publication Nos. 2004/0004022, 20040004027, and 2004/0004028, and more recently in U.S. application Ser. No. 11/068,615 filed Feb. 28, 2005, Ser. No. 10/851,486 filed May 21, 2004, Ser. No. 10/851,546 filed on May 21, 2004, Ser. No. 10/851,878 filed May 21, 2004, Ser. No. 10/851,494 filed on May 21, 2004, Ser. No. 10/851,487 filed May 21, 2004, Ser. No. 10/851,434 filed May 21, 2004, Ser. No. 10/851,495 filed May 21, 2004, Ser. No. 10/851,730 filed May 21, 2004, Ser. No. 10/851,500 filed May 21, 2004, Ser. No. 11/134,148 filed May 20, 2005, Ser. No. 10/975,703 filed Oct. 28, 2004, Ser. No. 10/891,795 filed Jul. 14, 2004, Ser. No. 10/891,981 filed Jul. 14, 2004, Ser. No. 10/893,716 filed Jul. 16, 2004, Ser. No. 11/009,661 filed Dec. 10, 2004, and Ser. No. 11/177,076 filed Jul. 8, 2005. Another preferred apparatus effective as a flash pot for purposes of the present invention is described in U.S. Pat. No. 6,632,351 as a "vapor/liquid separator". As far as the present inventors are aware, such devices have not, heretofore, been used to process high TAN crudes and fractions thereof as claimed in the present invention.

In the process of the present invention, the flash drum preferably operates at a temperature of between about 800° F. (about 425° C.) and about 850° F. (about 455° C.).

In a preferred embodiment, the invention is directed to a process for cracking a hydrocarbon feedstock comprising crude including resid and naphthenic acids, and having a TAN number of greater than or equal to about 0.5 mg KOH/g oil, more preferably about 1.0 mg KOH/g oil or higher, still more preferably about 1.5 mg KOH/g oil or higher, yet still more preferably 2.0 mg KOH/g oil, said process comprising heating said hydrocarbon feedstock in the convection section of a pyrolysis unit to produce a vapor phase, preferably at a temperature of about 1000° F. to about 1200° F. (about 540° C. to about 650° C.), flashing said feedstream to drop out the heaviest fraction(s) (e.g, asphaltenes), and subsequently cracking said vapor phase in the radiant section of a pyrolysis furnace, preferably at a temperature of about 1400° F. (about 760° C.) to about 1650° F. (about 900° C.), to produce an effluent comprising olefins and having a reduced amount of naphthenic acids.

Another preferred feedstream is a feedstream having resid previously removed, such as by a refinery pipestill, and having a TAN number of about 1.0 mg KOH/g oil or higher, more preferably about 1.5 mg KOH/g oil or higher, still more preferably 2.0 mg KOH/g oil.

In another preferred embodiment, the invention is directed to a process for cracking a hydrocarbon feedstock comprising napththenic acids wherein reside has been previously removed, such as by a refinery pipestill, and having a TAN number of about 1.0 mg KOH/g oil or higher, more preferably about 1.5 mg KOH/g oil or higher, still more preferably 2.0 mg KOH/g oil, said process comprising heating said hydrocarbon feedstock in the convection section of a pyrolysis unit to produce a vapor phase, preferably at a temperature of about 1000° F. to about 1200° F. (about 540° C. to about 650° C.), optionally passing the heated feedstream through a flash drum, and subsequently cracking said vapor phase in the radiant section of a pyrolysis furnace, preferably at a temperature of about 1400° F. (about 760° C.) to about 1750° F. (about 950° C.), to produce an effluent comprising olefins.

In accordance with the process of the present invention, the high TAN feedstock, with or without resid, is provided to the convection section of a pyrolysis unit (e.g, steam cracking furnace) to vaporize at least a portion of the high TAN feedstock. Subsequent to the convection section, in the case where a flash pot is used, the feedstock is then separated in said flash drum into a vapor phase and a liquid phase comprising asphaltenes (if present in said feedstock). The vapor phase, which should now contain substantially no asphaltenes, is feed to the radiant section of a pyrolysis unit. The vapor phase is subsequently cracked in the radiant section of the pyrolysis furnace to produce an effluent comprising olefins.

In a preferred embodiment, any remaining acids in the effluent may be neutralized downstream of the radiant section, preferably in the quench zone of the primary fractionator overhead and prior to water condensation, by a basic material, preferably an amine. More preferably, acids in the effluent are neutralized by amine injection at or near said quench zone. Caustic may be used instead of amine. Another option, which may be combined with use of base or caustic, is to upgrade the metallurgy of the primary fractionator overhead lines and exchangers in the zone where water condensation occurs to acid-resistant stainless steel (such as duplex stainless steels, a mixture of ferrite and austenite in various proportions and/or with various additives).

The present invention also provides a process for cracking a high TAN heavy hydrocarbon feedstock in a furnace which is comprised of radiant section burners which provides radiant heat and hot flue gas and a convection section comprised of multiple banks of heat exchange tubes comprising:

(a) preheating the high TAN heavy hydrocarbon feedstock (including resid and naphthenic acids) having a TAN value of at least 0.5, preferably 1.0, more preferably 1.5, still more preferably 2.0, to form a preheated heavy hydrocarbon feedstock;

(b) optionally mixing the preheated high TAN heavy hydrocarbon feedstock with water to form a water-heavy hydrocarbon mixture;

(c) then injecting primary dilution steam into the high TAN heavy hydrocarbon or water-heavy hydrocarbon to form a mixture stream;

(d) heating the mixture stream in a bank of heat exchange tubes by indirect heat transfer with the hot flue gas to form a hot mixture stream;

(e) optionally controlling the temperature of the hot mixture stream and/or controlling the ratio of water to hydrocarbon by varying the flow rate of the water and the flow rate of the primary dilution steam and/or varying the excess air and/or by the use of auxiliary convection burners;

(f) flashing the hot mixture stream in a flash drum to form a vapor phase and liquid phase and separating the vapor phase from the liquid phase;

(g) feeding the vapor phase into the convection section of the furnace to be further heated by the hot flue gas from the radiant section of the furnace to form a heated vapor phase; and (h) feeding the heated vapor phase to the radiant section tubes of the furnace wherein the hydrocarbons in the vapor phase thermally crack due to the radiant heat.

In preferred embodiments, where steam is used, after the high TAN feedstock is heated in the convection section of a pyrolysis unit to product a vapor phase and prior to cracking in the radiant section of a pyrolysis unit, the feedstock, which is preferably at a first temperature of about 300 to 650° F. (about 150 to about 340° C.) is mixed with steam (such as superheated and/or sour or treated steam) whereby it is heated to a second temperature, higher than said first temperature.

In a preferred embodiment, the effluent of the pyrolysis unit, such as the product of step (h), above, comprises one or more of ethylene, propylene, butenes, C5+ steam cracked naphtha, and C12+ steam cracked gas oil, along with CO, $CO_2$, formic acid, acetic acid, with very small amount of higher napthenic acids, such as less than 25%, preferably less than 20%, more preferably less than 15%, still more preferably less than 10%, of the napthenic acids present in the feedstream, based on TAN values of the feedstream relative to the TAN values of the product obtained from the effluent. Other minor components, such as light alkanes, aldehydes, acetylene, and the like, are also typically present.

The preferred products are the olefins, principally C2-C4 olefins. The specifics of the products and how they are recovered (e.g., as overheads or bottoms from subsequent fractionators) may vary from plant to plant as would understood by one of ordinary skill in the art. In a preferred embodiment, the effluent of the steam cracker is separated into a vapor phase consisting essentially of C2-C4 olefins, CO, and $CO_2$, and containing substantially no aliphatic acids and no C12+ naphthenic acids, and a liquid phase consisting essentially of steam-cracked naphtha (SCN), steam-cracked gas oil (SCGO), tar, light aliphatic acids (formic, acetic, propionic and butyric acids), and residual naphthenic acids (such as less than 25%, preferably less than 20%, more preferably less than 15%, still more preferably less than 10%, of the C12+ naphthenic acids present in the feedstream, based on TAN values of the feedstream relative to the TAN values of the product obtained from the effluent). In a still more preferred embodiment, this liquid phase may be further separated, by for instance a primary fractionator at about 560° C. at atmospheric pressure, into an overhead fraction comprising SCN, SCGO, and light aliphatic acids, and a bottoms fraction comprising tar and residual C12+ naphthenic acids (such as less than 25%, preferably less than 20%, more preferably less than 15%, still more preferably less than 10%, of the C12+ napthenic acids present in the feedstream, based on TAN values of the feedstream relative to the TAN values of the product obtained from the effluent).

In an embodiments the feedstock comprises a large portion, such as about 5 to 50%, of heavy non-volatile components comprising substantial amounts of asphaltenes and having TAN of at least 0.5, preferably 1.0, more preferably 1.5, and still more preferably 2.0. The term "substantial amounts of asphaltenes" means amounts that cause fouling in the lines of the steam cracker, which can be determined by one of ordinary skill in the art in possession of the present disclosure. Such feedstock could comprise, by way of non-limiting examples, one or more of steam cracked gas oil and residues, gas oils, heating oil, jet fuel, diesel, kerosene, gasoline, reformate, raffinate reformate, natural gasoline, distillate, virgin naphtha, all of which may be processed without the use of the flash pot, and also crude oil, atmospheric pipestill bottoms, vacuum pipestill streams including bottoms, wide boiling range naphtha to gas oil condensates, heavy non-virgin hydrocarbon streams from refineries, vacuum gas oils, heavy gas oil, naphtha contaminated with asphaltenes, atmospheric resid, heavy residuum, C4's/residue admixture, and naphtha residue admixture, all of which typically contain sufficient resid that the flash pot is used. In a preferred embodiment, the flash pot is used with feeds comprising at least 5.0 wt % of non-volatiles comprising asphaltenes (the term "non-volatiles" being materials that are not volatilized at the operating temperature of the flash pot). In a preferred embodiment, the flash pot is not used with feeds comprising less than about 0.1 wt % non-volatiles comprising asphaltenes. In cases where the feed comprises less than 5.0 wt % non-volatiles comprising asphaltenes, it is preferred that the feed be diluted so that the feed contains less than about 0.1 wt % non-volatiles comprising asphaltenes so that asphaltenes (or other components of the non-volatile fraction) do not create problems in the lines. In another preferred embodiment, the feedstream has been distilled or fractionated or is otherwise obtained from a refinery pipestill with less than 0.1 wt % asphaltenes, in which case the process of the invention does not require the use of a flash drum and the feedstream may be fed directly into the radiant section, after being preheated in the convection section, to be cracked.

In a preferred embodiment, the process comprises heating heavy hydrocarbon feedstock comprising a high TAN content of at least 0.5, preferably 1.0 and higher, or 1.5 and higher, or 2.0 and higher; the process comprising heating said heavy hydrocarbon in the convection section of a pyrolysis unit, mixing the heated heavy hydrocarbon with fluid to form a mixture, flashing the mixture to form a vapor phase and a liquid phase, and varying the amount of fluid mixed with the heavy hydrocarbon in accordance with at least one selected operating parameter of the process, preferably selected from (a) the temperature of the heavy hydrocarbon before the mixture is flashed; (b) pressure of the flash; (c) temperature of the flash; (d) flow rate of the mixture; (e) excess oxygen in the flue gas of the furnace; and feeding said vapor phase to a pyrolysis unit. The fluid can be a liquid hydrocarbon or water.

In a more preferred embodiment, the step of mixing with fluid to form a mixture occurs in the convection section of a pyrolysis unit either before, simultaneously, or after also adding steam in the convection section (as described herein elsewhere), i.e., prior to passing said feedstream to the radiant section where it is cracked.

In a more preferred embodiment, the high TAN hydrocarbon feedstock is heated in a first convection section tube bank of the pyrolysis furnace before mixing with steam and/or fluid, and after mixing with steam and/or fluid is again heated in a second convection section tube bank of the pyrolysis furnace. Note that heating of the high TAN hydrocarbon feedstock in the convection section is by indirect contact with flue gas, e.g, the high TAN hydrocarbon feedstock is passed in tubes through the convection section.

In the case where a fluid is mixed with the hydrocarbon feedstock, with our without steam, in a still more preferred embodiment the mixture comprises from about 2 to about 75 wt % of the heated mixture in the convection section (based on the high TAN heavy hydrocarbon feedstock, fluid, and optional steam).

Another preferred embodiment is explained as follows. When using a flash drum to separate the lighter volatile hydrocarbon as vapor phase from the heavy non-volatile hydrocarbon as liquid phase, the flash stream entering typical conventional flash drums usually comprises a vapor phase with liquid (the non-volatile hydrocarbon components) entrained as fine droplets referred to as a "mist flow" regime. In this mist flow regime, fine droplets comprising non-volatile heavy hydrocarbons are entrained in the vapor phase, which is the volatile hydrocarbons and optionally steam. In a preferred embodiment of the process according to the invention, effective removal of non-volatile hydrocarbon liquid from the volatile hydrocarbon vapor in the flash drum is accomplished by converting from a "mist flow" regime to an "annular flow" regime and hence significantly enhances the separation of non-volatile and volatile hydrocarbons in the flash drum. In this preferred embodiment, the heavy hydrocarbon feedstock having a high TAN content of at least 0.5, preferably 1.0 and higher, or 1.5 and higher, or 2.0 and higher, and optionally comprising steam, is preheated in the convection section of a steam cracking furnace to vaporize a portion of the feedstock and form a mist stream comprising liquid droplets comprising non-volatile hydrocarbon in volatile hydrocarbon vapor, optionally with steam, the mist stream upon leaving the convection section having a first flow velocity and a first flow direction, treating the mist stream to coalesce the liquid droplets, the treating comprising first reducing the flow velocity followed by changing the flow direction, separating at least a portion of the liquid droplets from the vapor in a flash drum to form a vapor phase and a liquid phase, and feeding the vapor phase to the thermal cracking furnace. In a preferred embodiment, the treating of the mist flow comprises reducing the flow velocity of the mist stream, such as by at least 40%, or such as to less than 60 feet/second (18 m/s). In another preferred embodiment, the mist stream flow velocity is reduced and then is subjected to at least one centrifugal force, such that the liquid droplets coalesce, and/or the mist stream can be subjected to at least one change in its flow direction, such as by flow through a path that comprises at least one bend, and/or the mist stream can be subjected to at least one expander.

The present invention also provides a process for cracking high TAN hydrocarbon feed according to the invention in a furnace, the furnace comprising a radiant section comprising burners that generate radiant heat and hot flue gas, and a convection section comprising heat exchange tubes, the process comprising: (a) preheating the hydrocarbon feed in heat exchange tubes in the convection section by indirect heat exchange with the hot flue gas from the radiant section to provide preheated feed; (b) adding water to the preheated feed in a first sparger and adding dilution steam to the preheated feed in a second sparger to form a feed mixture; (c) heating the feed mixture in heat exchange tubes in the convection section by indirect heat transfer with hot flue gas from the radiant section to form a heated feed mixture; and (d) feeding the heated feed mixture to the radiant section wherein the hydrocarbon in the heated feed mixture is thermally cracked to form products; wherein the water in (b) is added in an amount of from at least about 1% to 100% based on water and dilution steam by weight. The flash drum step is optional in the case of feedstreams without resid and required in the case of feedstreams with resid.

Yet another preferred embodiment is a process for cracking a hydrocarbon feedstock comprising resid, naphthenic acids, characterized by a TAN of at least 0.5, and further comprising non-volatile components including salt and/or particulate matter, comprising: (a) heating said hydrocarbon feedstock to a first temperature; (b) adding steam to the hydrocarbon feedstock; (c) further heating the hydrocarbon feedstock to a second temperature greater than the first temperature, said second temperature being such that a sufficient portion, such as at least 2 wt %, or 5 wt %, of the hydrocarbon feedstock remains in the liquid phase to maintain salt and/or particulate matter in suspension; (d) feeding the hydrocarbon feedstock to a flash/separation vessel; (e) separating the hydrocarbon feedstock into a vapor phase and a liquid phase, said liquid phase being rich in non-volatile components and said vapor phase being substantially depleted of non-volatile components; (f) removing the vapor phase from the flash/separation vessel; (g) adding steam to the vapor phase; and (h) cracking the vapor phase in a radiant section of a pyrolysis furnace to produce an effluent comprising olefins, said pyrolysis furnace comprising a radiant section and a convection section.

Of course, the numerous embodiments recited above, whether preferred or not, may be combined in countless ways as would be recognized by one of ordinary skill in the art in possession of the present disclosure. Thus, for instance, it goes without saying that the process recited in the previous paragraph concerning treatment of crude having salt and/or particulates therein, that the steam used in steps (b) and/or (g) may be sour or process steam.

It will be further appreciated by the same skilled artisan in possession of the present disclosure that, although details of operating conditions may be determined by reference inter alia to the Summary and Detail Description above, or the examples below, or without more than routine experimentation, certain conditions may be noted as preferred, such as: (a) the pressure in the radiant section is preferably from about 275 to about 1380 kPa (about 40 to 200 psia); (b) the temperature of the vapor phase entering the radiant section of the pyrolysis furnace is preferably from about 800 to about 1300° F. (about 425 to about 705° C.); and (c) preferably about 50 to 95 wt %, more preferably about 60 to about 90 wt %, of the high TAN hydrocarbon feedstock is in the vapor phase after the flash drum, if used.

EXPERIMENTAL

The following examples are meant to illustrate the present invention and provide a comparison with other methods and the products produced therefrom. Numerous modifications and variations are possible and it is to be understood that within the scope of the appended claims, the invention may be practiced otherwise than as specifically described herein.

The lab properties of the feeds used in the cracking experiments are listed in Table 1, along with distribution of TAN in the products obtained using a process according to the invention.

TABLE 1

Feed Properties

| Feed (example) | Cut (° F.) | TAN | Distribution of TAN (%) | | |
|---|---|---|---|---|---|
| | | | OH Distillate | BTMS Distillate | GAS (Balance) |
| Bunga Kekwa (1) | 68-1000 | 0.13 | 12 | 15 | 73 |
| Topacio (2) | 68-1000 | 1.10 | 35 | 5 | 60 |
| Duri (3) | 68-1000 | 1.82 | 28 | 13 | 59 |
| Zafiro (4) | 68-1000 | 0.59 | 22 | 7 | 70 |
| Zafiro (5) | 68-1000 | 0.59 | 28 | 9 | 62 |
| Zafiro (6) | 68-1000 | 0.59 | 31 | 18 | 50 |
| Zafiro (7) | 68-1000 | 0.70 | 23 | 20 | 56 |
| Zafiro (8) | 68-1000 | 0.70 | 22 | 9 | 69 |
| Doba/NWS admix (9) | 68-1000 | 2.21 | 26 | 16 | 58 |
| VGO (10) | Full | 0.51 | 29 | 16 | 54 |
| VGO (11) | Full | 0.51 | 25 | 9 | 67 |

The crude feeds in examples (1) through (9) were fractionated to produce a cut simulating the vapor fraction that exits the overhead of a flash drum according to the preferred embodiment of the invention. The VGO (Vacuum Gas Oil) of Examples (10-11) were obtained from a refinery pipestill.

Operating conditions in the steam cracking pilot unit reactor are given in Tables 2 and 3, below.

TABLE 2

Operating Conditions using He diluent (Examples 1-6)

| Feed Name | Bunga Kekwa (1) | Topacio (2) | Duri (3) | Zafiro (4) | Zafiro (5) | Zafiro (6) |
|---|---|---|---|---|---|---|
| Preheater temp, ° C. | 600 | 600 | 600 | 600 | 600 | 600 |
| Reactor temp, ° C. | 804 | 780 | 740 | 790 | 760 | 735 |
| Reactor pres, kPpag | 110 | 50 | 50 | 50 | 50 | 50 |

TABLE 2-continued

Operating Conditions using He diluent (Examples 1-6)

| Feed Name | Bunga Kekwa (1) | Topacio (2) | Duri (3) | Zafiro (4) | Zafiro (5) | Zafiro (6) |
|---|---|---|---|---|---|---|
| Severity $C_3H_6/CH_4$ | 1.47 | 1.24 | 1.62 | 1.26 | 1.52 | 1.68 |

TABLE 3

Operating Conditions using steam diluent (Examples 7-11)

| Feed Name | Zafiro (7) | Zafiro (8) | Doba/NWS (9) | VGO (10) | VGO (11) |
|---|---|---|---|---|---|
| Preheater temp, ° C. | 600 | 600 | 600 | 600 | 600 |
| Reactor temp, ° C. | 770 | 840 | 770 | 815 | 865 |
| Reactor pres, kpag | 120 | 120 | 120 | 120 | 120 |
| Severity $C_3H_6/CH_4$ | 1.64 | 1.20 | 1.73 | 1.74 | 1.14 |

Example (1)-(6) were run through a steam cracker pilot unit using helium as diluent. Examples (7-11) were run through a steam cracker pilot unit using steam as diluent. The ratio of propylene to methane, measured in the effluent by GC, is used as a measure of reaction severity.

Bunga Kekwa crude, having a relatively low TAN, was selected as a base case feed for comparison against the crudes run using He diluent. Topacio crude and Duri crude were selected to evaluate TAN distribution as a function of feed TAN with He diluent. Zafiro crude was selected to evaluate TAN distribution as a function of furnace severity and diluent—helium in Examples (4-6) vs steam in Examples (7-8). Doba/NWS (50/50 wt mix), having a relatively high feed TAN of 2.1, was selected to evaluate TAN distribution at a high feed TAN level using steam diluent. VGO (Vacuum Gas Oil), a current commercial feed typically ran admixed, was selected as a comparison and also used to compare the distribution of TAN in Tar between a small-scale pilot unit and a commercial unit.

Feeds were introduced at normal unit feed rates (60 g/hr using He diluent and 2 lbs/hr using steam cofeed) and cracked at the conditions shown in Tables 2 and 3.

The vapor effluent of the steam cracker pilot unit consists essentially of C4 and lighter components (C4−). The liquid fraction of the steam cracker pilot unit consist essentially of water (w/steam diluent) and C5 and heavier components (C5+). The liquid fraction is subsequently fractionated by distillation into a steam cracked naphtha overhead fraction (C5-C10 SCN) and steam cracked gasoil (boiling range of about 400 to about 550° F.; e.g., C10-C15/17 SCGO) and tar bottoms fraction (boiling range above 550° F.; e.g., C15/C17+ tar).

The composition and boiling range of the hydrocarbon products were determined by gas chromatography. TAN of the liquid hydrocarbon feeds and products was obtained using potentiometric titration per ASTM D-664. The acid content of the product water was determined by ion chromatography.

The percent of TAN appearing in the overheads and bottoms fractions were obtained from the potentiometric titration data. The percent of TAN appearing in the vapor phase from the steam cracker pyrolysis unit was obtained by difference between the feed TAN and the sum of the overheads and bottoms from the fractionation. This data is shown in Table 1.

As can be seen in Table 1, high TAN containing crude feedstreams according to the invention (Examples 2-9) may be cracked in a pyrolysis unit to yield useful products having TAN values substantially similar to or even better than that obtained using low TAN crudes (Example 1) or using feeds obtained from the refinery pipestill (Example 10-11). This is very surprising.

The invention may also be modified by one of ordinary skill in the art to incorporate advances in flash drum/knock-out drum design as well as advances in furnace design for thermal cracking (e.g., ceramic furnaces), as well as catalytic cracking.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. Preferred embodiments include: a process for cracking a high TAN hydrocarbon feedstock comprising naphthenic acids, said high TAN hydrocarbon feedstock selected from (i) crude feedstock further comprising resid (and in a preferred embodiment having non-volatiles comprising asphaltenes present in the amount of at least 5.0 wt %) and having a TAN of at least about 0.5, or about 1.0, or about 1.5, or about 2.0, or about 2.5; (ii) feedstock from a refinery pipestill having asphaltenes substantially removed therefrom (in a preferred embodiment less than 0.1 wt % non-volatiles comprising asphaltenes); and (iii) mixtures thereof, said process comprising: (a) heating said high TAN hydrocarbon feedstock in the convection section of a pyrolysis unit to produce vapor phase; (b) cracking said vapor phase in a radiant section of a pyrolysis furnace to produce an effluent comprising olefins, said furnace comprising a convection section and a radiant section; with the proviso that when said feedstock comprises non-volatiles including asphaltenes or when said feedstock consists essentially of (i) or (iii), said process further comprises passing said high TAN hydrocarbon feedstock from step (a) through a flash drum prior to step (b); and also, separately or as a species of the preferred embodiment just recited, a process wherein a high TAN hydrocarbon feedstock having a TAN greater than or equal to about 0.5, or about 1.0, or about 1.5, or about 2.0, or about 2.5, and further comprising non-volatile components including reside, further characterized by: heating said high TAN hydrocarbon feedstock to produce a heated hydrocarbon stream comprising a vapor phase in the convection section of a pyrolysis unit; feeding the heated hydrocarbon stream to a flash drum; removing a vapor phase from the flash drum; and cracking the vapor phase in a radiant section of a pyrolysis furnace to produce an effluent comprising olefins; and also, separately or as a species of either of the preferred embodiments just recited, a process for cracking a high TAN hydrocarbon feedstock comprising salt and/or particulate matter and non-volatile components, said process characterized by: heating said hydrocarbon feedstock to a first temperature; adding steam to the hydrocarbon feedstock; further heating the hydrocarbon feedstock to a second temperature greater than the first temperature, said second temperature being such that a sufficient portion of the hydrocarbon feedstock remains in the liquid phase to maintain salt and/or particulate matter in suspension; feeding the hydrocarbon feedstock to a flash drum (vapor/liquid separation vessel); separating the hydrocarbon feedstock into a vapor phase and a liquid phase, said liquid phase being rich in non-volatile components and said vapor phase being substantially depleted of non-volatile components, salt, and particulate matter; removing the vapor phase from the flash/separation vessel; adding steam to the vapor phase; and cracking the vapor phase in a radiant section of a pyrolysis furnace to produce an effluent comprising olefins, said pyrolysis furnace comprising a radiant section and a convection section; and also a process for making C2-C4 olefins comprising passing a hydrocarbon feedstock to a pyrolysis unit and cracking said hydrocarbon feedstock to produce an effluent comprising said olefins from said pyrolysis unit, wherein the improvement comprises passing a hydrocarbon feedstock comprising untreated crude (preferably having 5.0 wt % non-volatiles comprising asphaltenes) and having a TAN of at least about 0.5 (preferably about 1.0, or about 1.5, or about 2.0, or about 2.5) directly to the convection section of said pyrolysis unit and preheating said hydrocarbon feedstock to produced a heated hydrocarbon feedstock comprising a vapor phase, passing said hydrocarbon feedstock to a flash drum to obtain a vapor phase from said flash drum, passing said vapor phase to the radiant section of a pyrolysis unit, and cracking said vapor phase to obtain said effluent; and also a process for making C2-C4 olefins comprising passing a hydrocarbon feedstock to a pyrolysis unit and cracking said hydrocarbon feedstock to produce an effluent comprising said olefins from said pyrolysis unit, wherein the improvement comprises passing a hydrocarbon feedstock characterized as crude treated to remove resid and/or as the product of a refinery pipestill, (in either case preferably having less than about 0.1 wt % non-volatiles comprising asphaltenes either inherently or by virtue of having been diluted to contains less than that specified amount of non-volatiles comprising asphaltenes) and having a TAN of at least 1.0 (more preferably 1.5, still more preferably 2.0, yet still more preferably 2.5) directly to the convection section of said pyrolysis unit and preheating said hydrocarbon feedstock to produced a heated hydrocarbon feedstock comprising a vapor phase, optionally passing said hydrocarbon feedstock to a flash drum to obtain a vapor phase from said flash drum, passing said vapor phase from said convection section or optional flash drum to the radiant section of a pyrolysis unit, and cracking said vapor phase to obtain said effluent; and also a process for making olefins comprising refining high TAN crude oil, said crude oil having a TAN of about 0.5 or greater (or about 1.0 or greater, or about 1.5 or greater, or about 2.0 or greater, or about 2.5 or greater), comprising (a) a step of treating said crude oil to produce a feedstream having a lower the TAN than said crude oil; then (b) a step of refining said feedstream to produce a refinery fraction, then (c) feeding the product of step (b) to a pyrolysis unit and cracking said product to produce an effluent comprising olefins, the improvement comprising eliminating steps (a) and (b) and feeding said high TAN crude oil directly to said pyrolysis unit, heating said crude oil in the convection section of a pyrolysis unit to produce a heated feedstream comprising vapor, flashing said heated feedstream in a flash drum to remove a bottoms fraction comprising asphaltenes, and a vapor fraction comprising hydrocarbons, and then cracking said vapor fraction to produce an effluent comprising olefins; and also any of these process optionally having one or more of the following modifications, which can be applied as would be apparent by one of ordinary skill in the art in possession of the present disclosure: wherein steam is present in said convection section (wherein the steam optionally comprises sour or treated process steam, and/or wherein the steam is superheated in the convection section of the pyrolysis furnace), and especially preferred wherein the hydrocarbon stream is at a first temperature from about 150 to about 340° C. (about 300 to about 650° F.) before mixing with the steam, and the heated hydrocarbon stream is then further heated to a second temperature higher than the first temperature before cracking in the radiant section, and/or wherein said high TAN hydrocarbon feedstock is mixed with a fluid (other than steam) prior to the cracking step in the radiant section, and/or wherein said high TAN hydrocarbon feedstock contains salt and/or particulate matter; wherein the high TAN hydrocarbon feedstock is further characterized as comprising one or more of gas oil, heating oil, diesel, hydrocrackate, distillate, heavy gas oil, crude oil, atmospheric pipestill bottoms, vacuum pipestill streams including bottoms, heavy non-virgin hydrocarbon streams from refineries, vacuum gas oils, low sulfur waxy residue, heavy waxes; wherein the effluent from the pyrolysis unit is contacted with an amine or caustic; wherein the process is further characterized by passing said effluent from the pyrolysis unit into a primary fractionator to obtain an overhead phase consisting essentially of C2-C4 olefins, CO, $CO_2$, and a liquid phase comprising SCN, SCGO, tar, and C1-C4 aliphatic acids, and/or wherein the overhead phase from the primary fractionator comprises at least 50% of the feedstream TAN, said overhead phase further characterized by containing substantially no C12+ naphthenic acids, and/or distilling said liquid phase from the primary fractionator and recovering an overheads comprising SCN and SCGO and a bottoms comprising tar, said overheads further comprising acetic acid present in an amount at least an order of magnitude greater than any other aliphatic acid, said overheads further characterized by containing substantially no C12+ naphthenic acids, more preferably wherein the bottoms contains substantially all the C12+ naphthenic acids remaining in the effluent, and wherein said bottoms is characterized by a measured TAN less than 20% of the measured TAN of said hydrocarbon feedstream, or wherein the bottoms contains substantially all the C12+ naphthenic acids remaining in the effluent, and wherein said bottoms is characterized by a measured TAN less than 10% of the measured TAN of said hydrocarbon feedstream (again recognizing that in all cases, unless otherwise specified, TAN values take the units of mg KOH/g oil and are measured according to ASTM D-664). The invention may also be characterized as a method of removing TAN from high TAN crude or fractions thereof, a method of reducing the concentration of C12+ naphthenic acids in a high TAN hydrocarbon feedstock, and so forth characterized, in preferred embodiments, by the limitations set forth above.

Note that Trade Names used herein are indicated by a ™ symbol or ® symbol, indicating that the names may be protected by certain trademark rights, e.g., they may be registered trademarks in various jurisdictions. The meanings of terms used herein shall take their ordinary meaning in the art; reference shall be taken, in particular, to Handbook of Petroleum Refining Processes, Third Edition, Robert A. Meyers, Editor, McGraw-Hill (2004). In addition, all patents and patent applications, test procedures (such as ASTM methods), and other documents cited herein are fully incorporated by reference to the extent such disclosure is not inconsistent with this invention and for all jurisdictions in which such incorporation is permitted. Also, when numerical lower limits and numerical upper limits are listed herein, ranges from any lower limit to any upper limit are contemplated.

The invention claimed is:

1. A process for cracking a high TAN hydrocarbon feedstock comprising naphthenic acids, said high TAN hydrocarbon feedstock selected from (i) feedstock further comprising resid and having a TAN of at least 0.5 mg KOH/g oil (ASTM D-664); (ii) feedstock from a refinery pipestill having a TAN of at least 1.0 mg KOH/g oil (ASTM D-664) and having asphaltenes substantially removed therefrom; and (iii) mixtures thereof, said process comprising:
   a. heating said high TAN hydrocarbon feedstock in the convection section of a pyrolysis unit wherein steam is present to produce vapor phase;
   b. cracking said vapor phase in a radiant section of a pyrolysis furnace to produce an effluent comprising olefins, said furnace comprising a convection section and a radiant section;
   with the proviso that when said feedstock comprises nonvolatiles including substantial amounts of asphaltenes, said process further comprises passing said high TAN hydrocarbon feedstock from step (a) through a flash drum prior to step (b).

2. The process of claim 1, wherein the steam comprises sour or treated process steam.

3. The process of claim 1, wherein the steam is superheated in the convection section of the pyrolysis furnace.

4. The process of claim 1, wherein the hydrocarbon stream is at a first temperature from about 150 to about 340° C. (about 300 to about 650° F.) before mixing with said steam, and after said mixing the heated hydrocarbon stream is then further heated to a second temperature higher than the first temperature before step (b).

5. The process of claim 1, wherein said high TAN hydrocarbon feedstock is mixed with a fluid in addition to steam prior to step (b).

6. The process of claim 1, wherein said high TAN hydrocarbon feedstock contains salt and/or particulate matter.

7. The process of claim 1, wherein the high TAN hydrocarbon feedstock comprises one or more of gas oils, heating oil, diesel, hydrocrackate, distillate, heavy gas oil, crude oil, atmospheric pipestill bottoms, vacuum pipestill streams including bottoms, heavy non-virgin hydrocarbon streams from refineries, vacuum gas oils, low sulfur waxy residue, and heavy waxes.

8. The process of claim 1, further comprising contacting said effluent with an amine or caustic.

9. The process of claim 1, further comprising passing said effluent into a primary fractionator to obtain an overhead phase consisting essentially of C2-C4 olefins, CO, $CO_2$, and a liquid phase comprising SCN, SCGO, tar, and C1-C4 aliphatic acids.

10. The process of claim 9, wherein said overhead phase is treated with caustic or amine at or near the quench zone of said primary fractionator.

11. The process of claim 9, wherein said overhead phase comprises at least 50% of the feedstream TAN, said overhead phase further characterized by containing substantially no C12+ naphthenic acids.

12. The process of claim 9, further comprising distilling said liquid phase and recovering an overheads comprising SCN and SCGO and a bottoms comprising tar, said overheads further comprising acetic acid present in an amount at least an order of magnitude greater than any other aliphatic acid, said overheads further characterized by containing substantially no C12+ naphthenic acids.

13. The process of claim 11, wherein said bottoms contains substantially all the C 12+ naphthenic acids remaining in the effluent, and wherein said bottoms is characterized by a measured TAN less than 20% of the measured TAN of said hydrocarbon feedstream.

14. The process of claim 11, wherein said bottoms contains substantially all the C 12+ naphthenic acids remaining in the effluent, and wherein said bottoms is characterized by a measured TAN less than 10% of the measured TAN of said hydrocarbon feedstream.

15. The process according to claim 1, wherein said high TAN hydrocarbon feedstock has a TAN greater than or equal to about 0.5 mg KOH/gm oil and further comprises non-volatile components including resid, further characterized by:
a. heating said high TAN hydrocarbon feedstock to produce a heated hydrocarbon stream comprising a vapor phase in the convection section of a pyrolysis unit;
b. feeding the heated hydrocarbon stream to a flash drum;
c. removing a vapor phase from the flash drum; and
d. cracking the vapor phase in a radiant section of a pyrolysis furnace to produce an effluent comprising olefins.

16. The process according to claim 1, wherein said high TAN hydrocarbon feedstock further comprises salt and/or particulate matter and non-volatile components, said process further characterized by:
a. heating said hydrocarbon feedstock to a first temperature;
b. adding steam to the hydrocarbon feedstock;
c. further heating the hydrocarbon feedstock to a second temperature greater than the first temperature, said second temperature being such that a sufficient portion of the hydrocarbon feedstock remains in the liquid phase to maintain salt and/or particulate matter in suspension;
d. feeding the hydrocarbon feedstock to a flash/separation vessel;
e. separating the hydrocarbon feedstock into a vapor phase and a liquid phase, said liquid phase being rich in non-volatile components and said vapor phase being substantially depleted of non-volatile components, salt, and particulate matter;
f. removing the vapor phase from the flash/separation vessel;
g. adding steam to the vapor phase; and
h. cracking the vapor phase in a radiant section of a pyrolysis furnace to produce an effluent comprising olefins, said pyrolysis furnace comprising a radiant section and a convection section.

17. In a process for making C2-C4 olefins comprising passing a hydrocarbon feedstock to a pyrolysis unit and cracking said hydrocarbon feedstock to produce an effluent comprising said olefins from said pyrolysis unit, wherein the improvement comprises passing a hydrocarbon feedstock comprising untreated crude and having a TAN of at least 0.5 mg KOH/g oil (ASTM D-664) directly to the convection section of said pyrolysis unit and preheating and injecting primary dilution steam into said hydrocarbon feedstock to produce a heated hydrocarbon feedstock comprising a vapor phase, passing said hydrocarbon feedstock to a flash drum to obtain a vapor phase from said flash drum, passing said vapor phase to the radiant section of a pyrolysis unit, and cracking said vapor phase to obtain said effluent.

18. The process of claim 17, wherein said TAN is at least 1.0.

19. The process of claim 17, wherein said TAN is at least 1.5.

20. The process of claim 17, wherein said TAN is at least 2.0.

21. In a process for making C2-C4 olefins comprising passing a hydrocarbon feedstock to a pyrolysis unit and cracking said hydrocarbon feedstock to produce an effluent comprising said olefins from said pyrolysis unit, wherein the improvement comprises passing a hydrocarbon feedstock characterized as crude treated to remove resid and/or as the product of a refinery pipestill, and having a TAN of at least 1.0 mg KOH/g oil (ASTM D-664) directly to the convection section of said pyrolysis unit and preheating and injecting primary dilution steam into said hydrocarbon feedstock to produce a heated hydrocarbon feedstock comprising a vapor phase, optionally passing said hydrocarbon feedstock to a flash drum to obtain a vapor phase from said flash drum, passing said vapor phase from said convection section or optional flash drum to the radiant section of a pyrolysis unit, and cracking said vapor phase to obtain said effluent.

22. The process of claim 21, wherein said TAN is at least 1.5.

23. The process of claim 21, wherein said TAN is at least 2.0.

24. In a process for making olefins comprising refining high TAN crude oil, said crude oil having a TAN of 0.5 mg KOH/g oil (ASTM D-664) or greater, comprising (a) a step of treating said crude oil to produce a feedstream having a lower the TAN than said crude oil; then (b) a step of refining said feedstream to produce a refinery fraction, then (c) feeding the product of step (b) to a pyrolysis unit and cracking said product to produce an effluent comprising olefins, the improvement comprising eliminating steps (a) and (b) and feeding said high TAN crude oil directly to said pyrolysis unit, heating said crude oil in the convection section of a pyrolysis unit to produce a heated feedstream comprising vapor and injecting primary dilution steam into the heated feedstream, flashing said heated feedstream in a flash drum to remove a bottoms fraction comprising asphaltenes, and a vapor fraction comprising hydrocarbons, and then cracking said vapor fraction to produce an effluent comprising olefins.

* * * * *